3,177,261
PREPARATION OF TETRAFLUOROETHYLENE
Kenneth Stanley Revell, Northwich, England, assignor to Imperial Chemical Industries Limited, London, England, a corporation of Great Britain
No Drawing. Filed July 29, 1963, Ser. No. 298,447
Claims priority, application Great Britain, Aug. 16, 1962, 31,496/62
6 Claims. (Cl. 260—653.5)

This invention relates to an improved method of making tetrafluoroethylene by pyrolysis of monochlorodifluoromethane.

It is known to make tetrafluoroethylene by pyrolysing chlorofluoroparaffins, particularly monochlorodifluoromethane, $CHClF_2$, at temperatures of 500°–700° C. Under favourable conditions up to about 10% of the products of the pyrolysis may consist of other chlorofluorohydrocarbons, for example those having the general formula $H(CF_2)_nCl$, and of fluorocarbons for example hexafluoropropene and perfluorocyclobutane, and though yields may be as high as 90% conversions of $CHClF_2$ are low, for example 20–25% per pass through the pyrolysis apparatus.

We have now found that if monochlorodifluoromethane is pyrolysed by contacting it with a melt-system comprising a metal oxide dissolved or dispersed in a molten mixture of one or more alkali metal chlorides, for example, sodium chloride and/or potassium chloride, and the chloride of the metal, tetrafluoroethylene is formed in good yield and at high conversions of $CHClF_2$.

According to our invention a process for making tetrafluoroethylene by the pyrolysis of monochlorodifluoromethane is characterised in that the pyrolysis is effected by contacting monochlorodifluoromethane with a melt-system comprising an oxide of a metal, whose chloride is stable at the temperature of and under the conditions of the pyrolysis, and a molten mixture of the chloride of said metal and at least one chloride selected from the group consisting of alkali metal chlorides.

The main function of the metal oxide is to neutralise hydrogen chloride formed from the monochlorodifluoromethane during the pyrolysis according to the equation $$2CHClF_2 \rightarrow C_2F_4 + 2HCl$$

Consequently it should be a stable oxide that forms a stable chloride. Suitable examples are monoxides of the alkaline earth metals particularly calcium oxide CaO. Suitable proportions of the oxide in the melt are from 5 to 15 mole percent.

The main function of the molten mixture of metal chlorides is to provide a pyrolysing environment at a suitable temperature, which is from 600° to 800° C., preferably from about 675° to 710° C. By choice of chlorides one can thus arrange to have a melt of desired physical characteristics at various temperatures, and a very convenient combination is the sodium chloride/calcium chloride eutectic mixture. This has a reasonably low viscosity over the preferred temperature range and so readily allows monochlorodifluoromethane and inert carrier gases to be bubbled through if desired. It also has the advantage of being composed of cheap and readily available materials and of being able to be contained in mild steel, whereas some known pyrolytic processes for making tetrafluoroethylene in vapour-phase systems require platinum-lined equipment. The monochlorodifluoromethane is conveniently contacted with the melt by bubbling through by means of a dip-pipe, but it may be passed over the melt or through a falling melt or in other ways that will occur to the chemical engineer.

The proportion of monochlorodifluoromethane converted over the preferred temperature range of 675° to 750° C. is over 90%, and since relatively small amounts of products other than tetrafluoroethylene are formed the yield of the latter is also high.

To achieve these high conversions and high yields it is important to reduce as far as possible the residence times of ingoing monochlorodifluoromethane in entrance zones to the melt system, and of outgoing products in exit zones from the system. Residence times in entrance zones can be reduced by reducing the internal volume of the dip-pipe through which the monochlorodifluoromethane is carried into the body of the melt. Reduction of residence times of outgoing products can be conveniently brought about by sweeping the zone above the melt with a fast flow of dry steam. Steam at 300°–350° C. introduced in this way quenches reactions in gaseous products emerging from the melt and rapidly sweeps the products out of the pyrolysis system. The steam also produces a change in the composition of the products in that their relative tetrafluoroethylene content increases and their content of hexafluoropropene and perfluorocyclobutane decreases with increasing volumes of steam up to a fairly steady state at a proportion of about 50 moles of steam per mole of monochlorodifluoromethane. Actual residence times of the monochlorodifluoromethane in contact with the melt are short, of the order of a second or less, and preferably from 0.10 to 0.5 second if the highest yields are to be obtained.

The pyrolysis is conveniently carried out at atmospheric or slightly higher pressure for example up to 80 cms. mercury absolute. The monochlorodifluoromethane can be passed undiluted through the system or it can if desired be diluted with an inert carrier gas for example nitrogen, or with steam (distinct from steam used for quenching), the total pressure remaining at atmospheric or just above so that the partial pressure of monochlorodifluoromethane is less than atmospheric. Dilution with nitrogen tends to increase yield of tetrafluoroethylene but to decrease the degree of conversion, for example the yield may rise to about 92% whilst the conversion falls to about 75% at a molar dilution ratio of 2 of nitrogen to 1 of monochlorodifluoromethane. Dilution with steam appears at up to equimolar ratios to reduce markedly the proportion of perfluorocyclobutane formed, but it favours loss of fluorine to the melt.

The invention is illustrated by a series of experiments whose results are given in Tables 1 and 2. Table 1 shows the effect of melt temperature on the reaction; Table 2 shows the effect of residence time in the melt at 690° C. and 80 cms. Hg absolute. In the experiments forming the basis of Table 1 monochlorodifluoromethane was introduced at a steady rate of 100 mls/minute, at a pressure of 79–80 cms. Hg absolute, through a graphite-lined dip-pipe having an internal diameter 1.0 mm. and immersed to a depth of 16.5 cms. into a melt containing 15 to 5 mole percent CaO in $CaCl_2$ (4.29 moles) and NaCl (3.69 moles). The gaseous products released from the melt were swept clear of the system with steam at 320° C. introduced at a rate of 50 to 55 moles of steam per mole of monochlorodifluoromethane, and after condensation of the steam were collected in traps cooled with liquid air. After this the contents of the traps were expanded at room temperature into glass gas holders sealed with mercury and analysed by means of gas-liquid chromatography. Similar experimental procedures were used to obtain the results given in Table 2.

Table 1

| Temperature of melt, °C. | Percent Conversion of $CHClF_2$ | Percent Yield $C_2F_4$ |
|---|---|---|
| 630 | 37 | 78 |
| 650 | 64 | 75 |
| 680 | 90 | 73 |
| 690 | 96 | 71 |
| 700 | 98.5 | 70 |
| 703 | 99 | 72 |
| 720 | 99 | 50 |

Table 2

| Temperature of melt, °C. | Rate of through put of $CHClF_2$, mls./minute | Percent Conversion of $CHClF_2$ | Percent Yield $C_2F_4$ |
|---|---|---|---|
| 690 | 40 | 96 | 68 |
| 690 | 100 | 98 | 69 |
| 690 | 200 | 90 | 74 |
| 690 | 400 | 83 | 81 |

What I claim is:

1. In a process for making tetrafluoroethylene by the pyrolysis of monochlorodifluoromethane, the improvement which comprises effecting said pyrolysis by contacting the monochlorodifluoromethane with a melt-system at a pyrolyzing temperature in the range of 600–800° C., said melt-system comprising an oxide of an alkaline earth metal and a molten mixture of the chloride of said metal and at least one alkali metal chloride.

2. A process as claimed in claim 1 in which the metal oxide is chosen from the group consisting of monoxides of calcium, strontium and barium and the group of alkali metal chlorides consists of sodium and potassium chlorides.

3. A process as claimed in claim 1 in which the metal oxide is calcium oxide, CaO, and the molten mixture of chlorides comprises sodium chloride and calcium chloride.

4. A process as claimed in claim 3 in which the temperature of the melt-system is from 675° C. to 710° C. and the sodium chloride and calcium chloride are present there in a weight ratio equivalent to that of the eutectic mixture of anhydrous NaCl and anhydrous $CaCl_2$, and the proportion of calcium oxide, CaO, is from 5 to 15 mole percent, and the contact time of monochlorodifluoromethane with the melt-system is less than one second.

5. A process as claimed in claim 4 in which the monochlorodifluoromethane is diluted with steam.

6. A process as claimed in claim 4 in which the monochlorodifluoromethane is diluted with nitrogen.

References Cited by the Examiner

UNITED STATES PATENTS 2,140,548   12/38   Reilly _____ 260—654

FOREIGN PATENTS 859,887   12/52   Germany.

LEON ZITVER, *Primary Examiner.*
DANIEL D. HORWITZ, *Examiner.*